US010205786B2

(12) United States Patent
Sridharan et al.

(10) Patent No.: US 10,205,786 B2
(45) Date of Patent: Feb. 12, 2019

(54) MULTI-USER APPLICATION EXECUTING IN USER PRIVILEGE MODE (71) Applicant: Microsoft Technology Licensing, LLC, Redmond, WA (US)

(72) Inventors: Giridharan Sridharan, Bellevue, WA (US); Vishal Agarwal, Kirkland, WA (US); Geir Olsen, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 288 days.

(21) Appl. No.: 15/135,990

(22) Filed: Apr. 22, 2016

(65) Prior Publication Data

US 2017/0310759 A1   Oct. 26, 2017

(51) Int. Cl.
| H04L 29/08 | (2006.01) |
| H04L 9/32 | (2006.01) |
| H04W 12/08 | (2009.01) |
| H04W 12/06 | (2009.01) |

(52) U.S. Cl.
CPC ............ *H04L 67/14* (2013.01); *H04L 9/32* (2013.01); *H04L 9/3213* (2013.01); *H04L 9/3228* (2013.01); *H04L 67/306* (2013.01); *H04W 12/06* (2013.01); *H04W 12/08* (2013.01)

(58) Field of Classification Search
CPC ....... H04L 9/32; H04L 9/3213; H04L 9/3228; H04L 67/14; H04L 67/30; H04W 12/06; H04W 12/08
See application file for complete search history.

(56) References Cited

U.S. PATENT DOCUMENTS

| 5,915,085 A | 6/1999 | Koved |
| 7,568,098 B2 | 7/2009 | Yeates et al. |
| 7,926,086 B1 | 4/2011 | Violleau et al. |
| 8,332,922 B2 | 12/2012 | Dickinson et al. |
| 9,104,893 B2 | 8/2015 | Gallardo et al. |
| 2005/0147086 A1* | 7/2005 | Rosenberg ........ H04L 29/06027 370/352 |
| 2007/0157297 A1 | 7/2007 | Patrick |

(Continued)

OTHER PUBLICATIONS

"Managing Authorization and Access Control," Published on: Nov. 3, 2005 Available at: https://technet.microsoft.com/en-us/library/bb457115.aspx.

(Continued)

*Primary Examiner* — Gil H. Lee
(74) *Attorney, Agent, or Firm* — Fountainhead Law Group P.C.

(57) ABSTRACT

A method and system for providing a multi-user application executing in a user privilege mode with access to resources of multiple users is described. The multi-user application identifies a first user and a second user of the multi-user application. The multi-user application retrieves an access token for the first user and an access token for the second user. Each access token provides evidence of authorization to access a resource in accordance with access rights of the user. The multi-user application accesses resources by providing one of the access tokens as evidence of authorization to access the resource in accordance with the access rights of the user. The multi-user application can thus access resources of multiple users without having to execute in a system privilege mode.

20 Claims, 11 Drawing Sheets

(56) References Cited

U.S. PATENT DOCUMENTS

| | | | |
|---|---|---|---|
| 2009/0271847 A1* | 10/2009 | Karjala | H04L 63/0807 726/6 |
| 2010/0077445 A1 | 3/2010 | Schneider et al. | |
| 2011/0055893 A1* | 3/2011 | Walls | H04L 65/1069 726/3 |
| 2012/0131646 A1 | 5/2012 | Chandolu et al. | |
| 2014/0173125 A1* | 6/2014 | Selvanandan | H04L 67/141 709/229 |
| 2015/0143471 A1* | 5/2015 | Kim | H04W 12/06 726/4 |

OTHER PUBLICATIONS

Backes et al., "AppGuard—Enforcing User Requirements on Android Apps," in Proceedings of the 19th international conference on Tools and Algorithms for the Construction and Analysis of Systems, Mar. 16, 2013, 6 pages.

Conti et al., "CRePE: Context-Related Policy Enforcement for Android," in Proceedings of the 13th international conference on Information, Oct. 25, 2010, 15 pages.

"Introduction to Zope Security," Published on: Oct. 21, 2009 Available at: http://docs.zope.org/zope2/zope2book/Security.html.

Hu et al., "A Dynamic, Context-Aware Security Infrastructure for Distributed Healthcare Applications," in Proceedings of the first workshop on pervasive privacy security, privacy, and trust, Aug. 26, 2004, pp. 1-8.

* cited by examiner

MULTI-USER APPLICATION EXECUTING IN USER PRIVILEGE MODE

BACKGROUND

Many application programs are multi-user applications in that they allow multiple users to interact with the application concurrently. One example of a multi-user application may be a collaboration application that allows multiple users to collaborate by sharing information. The collaboration application may allow each user to access his or her own resources, such as files, emails, and calendars, and may even allow one user to access the resources of another user. For example, one user may share a directory of files that the other user can view and modify. Another example of a multi-user application may be a gaming application that allows multiple users to play against each other. The gaming application may allow each user to access his or her resources such as music files, files describing his or her character's personality, handheld controls (e.g., to change functions of buttons), and so on. The gaming application may even allow some users to access resources of other users. For example, the gaming application may display to each member of a team the combined list of the music files of the team members and allow any member to play any of the music files of the team members.

Operating systems typically allow applications to execute in various privilege modes. Applications generally execute in a relatively low privilege mode, such as user privilege mode. In user privilege mode, the application has access to only those resources to which the user running the application has access. Thus, an application executing in user privilege mode can access the music files of the user, but not the music files of other users. The application cannot, however, access operating system resources directly. The use of user privilege mode helps ensure that one user cannot access the resources of another user or the operating system without permission to do so. The use of user privilege mode is especially important in large data centers, such as cloud data centers, in which virtually any person can subscribe to the services of the data center. The data centers want to ensure the confidentiality of their customers' data.

To allow a multi-user application to access the resources of multiple users, the multi-user application may execute in a relatively high privilege mode, such as a system privilege mode (e.g., kernel privilege mode). In a system privilege mode, the application has virtually unlimited access to all the resources of the users of the application, as well as all the resources of other users and the operating system itself. Because such multi-user applications require such a high privilege mode, a data center that hosts such multi-user applications may implement rigorous quality control procedures to ensure that each multi-user application is developed to only access the resources of its users.

Although the quality control procedures may be rigorous, there is a possibility that a bug in a multi-user application may result in access to resources of non-users of the application or the operating system. Moreover, it is also possible that a multi-user application may be infected with malware that intentionally accesses such resources.

SUMMARY

A method and system for providing an application with access to resources of multiple users is provided. In some examples, the application identifies at least a first user and a second user. The application retrieves a first access token for the first user. The first access token provides evidence of authorization to access a first resource in accordance with first access rights of the first user. The application also retrieves a second access token for the second user. The second access token provides evidence of authorization to access a second resource in accordance with second access rights of the second user. The application accesses the first resource by providing the first access token as evidence of authorization to access the first resource in accordance with first access rights of the first user. The application also accesses the second resource by providing the second access token as evidence of authorization to access the second resource in accordance with second access rights of the second user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A method and system for providing a multi-user application executing in a low privilege mode with access to resources of multiple users is provided. In some examples, a multi-user system includes a multi-user application and a multi-user environment that hosts the multi-user application. The multi-user environment may be, for example, an operating system and runtime environment that provides services to the multi-user application and accesses services of the operating system. The multi-user application and the multi-user environment interact to allow the multi-user application to access the resources of the users of the multi-user application, but not to access resources of other users or directly access resources of the multi-user environment. When the multi-user application starts execution, it identifies users of the multi-user application. For example, each user that logs on to the multi-user environment may be a user of the multi-user application. In such a case, the multi-user application may ask the multi-user environment to provide the identifications of the users who are logged on. The multi-user application then retrieves an access token for each identified user. The access token for a user provides evidence of authorization to access resources in accordance with access rights of that user. The multi-user application may request the multi-user environment to provide the access tokens for all users who are logged on. In addition, each access token may further provide evidence of authorization to access resources in accordance with access rights of the multi-user application. For example, a multi-user music player may have access rights to only music files. Thus, an access token for a user of the multi-user music player would provide evidence of authorization to access only the music files of that user. The access rights may indicate, for example, the directories of a file system to which the user has access and whether the access is read-only or read-write. When the multi-user application requests a service (e.g., a file system of the multi-user environment) to allow it to access a certain resource, the multi-user application provides the access token of a user to the service as evidence of authorization. For example, when the multi-user music player requests to open a music file of a user, it provides the access token of that user to the file system. If the access token provides evidence that access to the resource is allowed, the service allows the multi-user application to access the resource. In this way, a multi-user application can access the resources of multiple users while executing in a low privilege mode. If such multi-user application (e.g., one infected with malware) were to attempt to access resources other than those authorized by an access token, the access would be prevented.

In some examples, the multi-user environment creates an access token for each user of the multi-user application. The access token provides evidence of authorization to access resources in accordance with access rights of the user and access rights of the multi-user application. For example, an access token may identify the user and the multi-user application and may be signed by the multi-user environment, for example, using a key (e.g., symmetric key) of the multi-user environment. When requesting access to a resource of a user, the multi-user application provides the access token of that user to the service that controls access to the resource (e.g., a file system controls access to files). The service determines whether the requested access is authorized based on the evidence of authorization provided by the access token. For example, the service may verify the signature using the symmetric key of the multi-user environment and look up the access rights of the user and the multi-user application identified in the access token. If the access rights indicate that the requested access is authorized, the service provides a handle for the resource to the multi-user application. A handle may include an identifier that the service uses to identify the resource. For example, a file system may maintain an open file table that includes an entry for each open file. The identifier in a handle may be the index of the entry for that file in the open file table. When the user logs off the multi-user environment, the multi-user environment may designate the handle as invalid and designate the access token as revoked. If the multi-user application were to try to access a resource using that handle or the access token after the user has logged off, the service would determine that the handle is invalid or the access token is revoked and not allow the access. In this way, the multi-user application is allowed access only to resources in accordance with the access rights of the multi-user application and users who are currently logged on.

The multi-user system overcomes the security problems that may arise when a multi-user application executes in a high privilege mode, such as malware accessing system resources. Other alternative solutions may involve the multi-user application requesting the operating system to switch the multi-user application from executing with access rights of one user to another user whenever the multi-user application is to access a resource. Such continual requesting to switch users can be computationally expensive (e.g., multiple context switches between the operating system and the multi-user application). In addition, the multi-user application may need to have access to the security credentials (e.g., password) of each user, which presents security problems such as malware stealing the security credentials of a user and providing the security credentials to an untrustworthy party. Another alternative may involve modifying an operating system or other multi-user environment to implement a multi-user privilege mode. In such an alternative, an operating system may track users who are logged on and allow a multi-user application executing in multi-user privilege mode to access resources in accordance with the access right of the users who are currently logged on and access rights of the multi-user application. With such an alternative, access tokens may not be needed.

Figure 1:
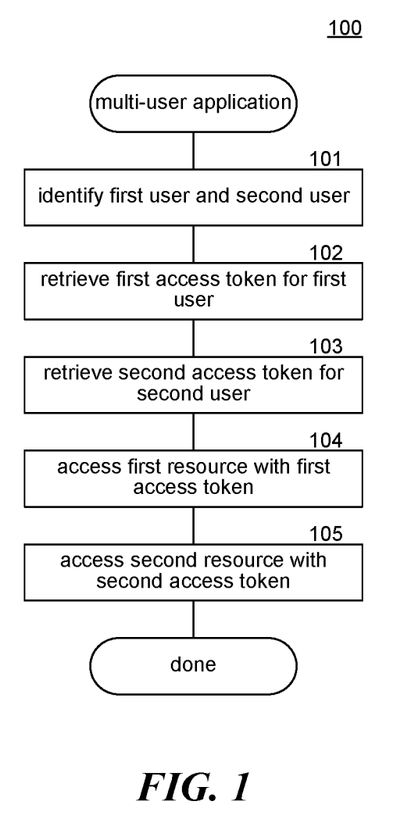
FIG. 1 is a flow diagram that illustrates the processing of a multi-user application using techniques of a multi-user system in some examples.

FIG. 1 is a flow diagram that illustrates the processing of a multi-user application using techniques of a multi-user system in some examples. The multi-user application 100 executing in user privilege mode uses access tokens, which may also be referred to as security tokens, to access resources of multiple users. In block 101, the multi-user application identifies a first user and a second user of the multi-user application. For example, the multi-user application may request the multi-user environment to provide the identity of all the users logged on to the multi-user environment. In block 102, the multi-user application retrieves a first access token for the first user. In block 103, the multi-user application retrieves a second access token for the second user. The multi-user application may request the multi-user environment to generate the access tokens for the users. In block 104, the multi-user application accesses the first resource of a service by providing the first access token as evidence of the access rights of the first user and the multi-user application. In block 105, the multi-user application accesses a second resource of a service by providing the second access token as evidence of the access rights of the second user and the multi-user application. The service uses an access token to determine whether access to the resource is authorized and, if so, allows access to the resource. The multi-user application then completes.

Figure 2:
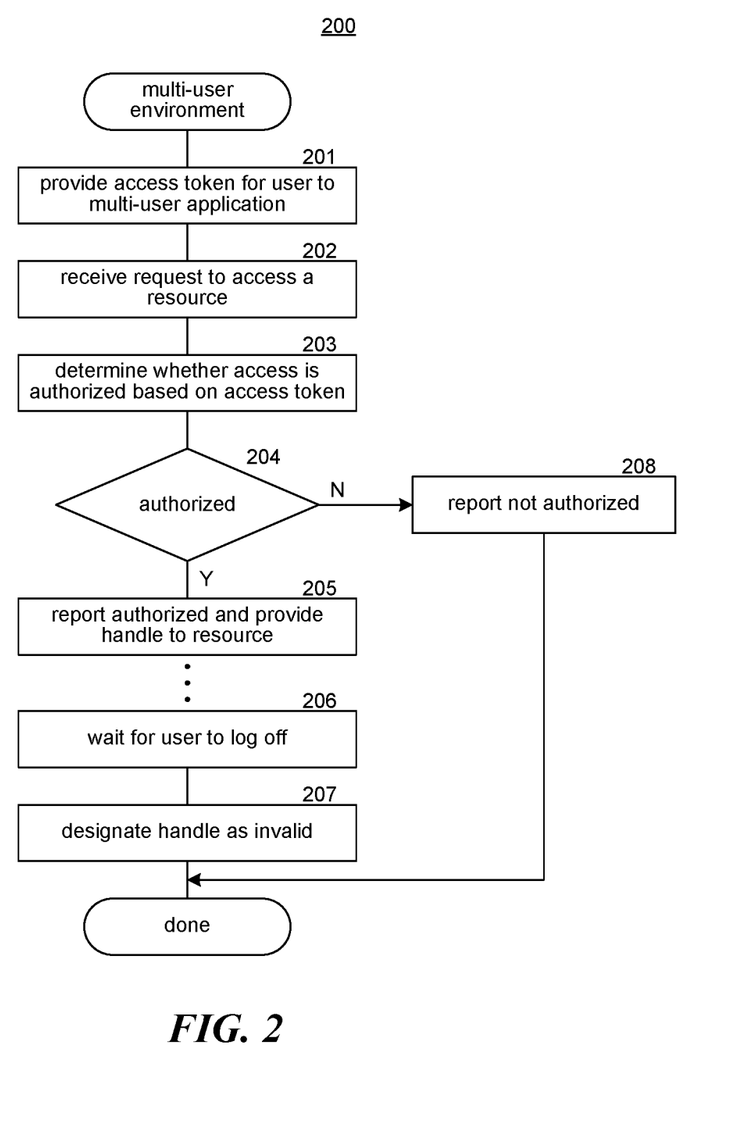
FIG. 2 is a flow diagram that illustrates the processing of a multi-user environment using techniques of a multi-user system in some examples.

FIG. 2 is a flow diagram that illustrates the processing of a multi-user environment using techniques of a multi-user system in some examples. The multi-user environment 200 generates access tokens for users of the multi-user application and determines whether requests to access resources are authorized by the access tokens. In block 201, the multi-user environment provides the access token for a user of the multi-user application. The multi-user environment may generate the access token by encrypting both an identifier of the user and an identifier of the application using a secret key of the multi-user environment. The multi-user environment then stores the encrypted identifiers as part of the access token and provides the access token to the multi-user application. Alternatively, the multi-user environment may encrypt the descriptions of the access rights of the user and the multi-user application, rather than just their identifiers, and store the encrypted descriptions as part of the access token. In block 202, the multi-user environment receives a request to access a resource along with an access token. In block 203, the multi-user environment determines whether the access is authorized based on the access rights of the user and the multi-user application identified by the access token. The multi-user environment may decrypt the encrypted identifiers using the secret key of the multi-user environment and use those identifiers to retrieve the access rights for the user and the multi-user application. In decision block 204, if the requested access is authorized, then the multi-user environment continues at block 205, else the multi-user environment continues at block 208 to report to the multi-user application that the access is not authorized and then completes. In block 205, the multi-user environment reports to the multi-user application that the access is authorized and provides a handle for accessing the resource. In block 206, at some time later, the multi-user environment detects that the user is logging off the multi-user environment. In block 207, the multi-user environment then designates that the handle has been revoked to prevent further access to resources that were initially accessed using the access token for the user. The multi-user environment then completes.

Figure 3:
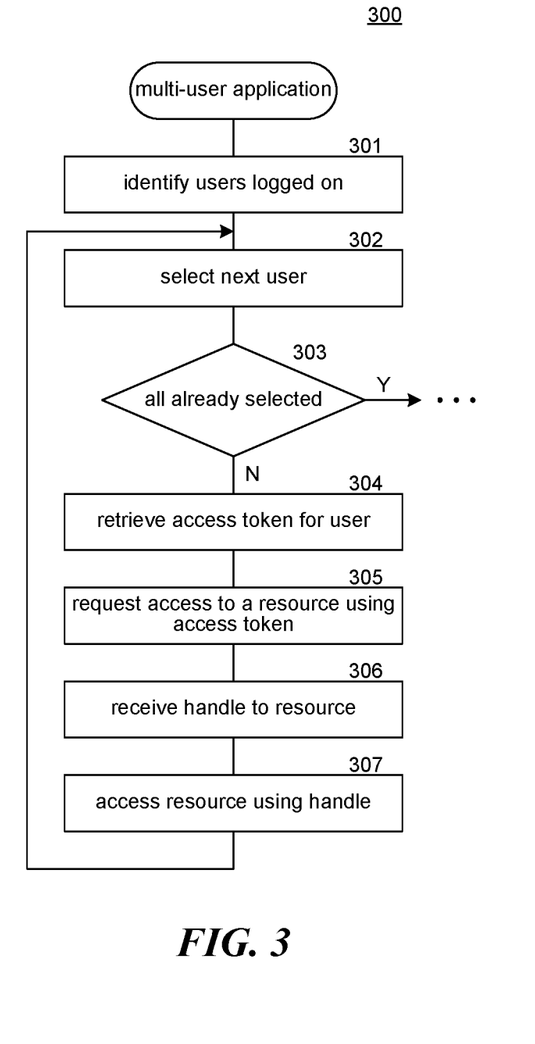
FIG. 3 is a flow diagram that illustrates alternative processing of a multi-user application in some examples.

FIG. 3 is a flow diagram that illustrates alternative processing of a multi-user application in some examples. The multi-user application 300 may provide access to resources in accordance with access rights of any number of users of the multi-user application. In block 301, the multi-user application identifies the users who are logged on. In blocks 302-307, the multi-user application loops accessing resources of each identified user. In block 302, the multi-user application selects the next identified user. In decision block 303, if all the identified users have already been selected, then the multi-user application continues with additional processing, else the multi-user application continues at block 304. The additional processing would typically be dependent on the type of multi-user application, such as a collaboration application or a gaming application. In block 304, the multi-user application retrieves the access token for the selected user, which may be provided in response to the multi-user application requesting the access token from the multi-user environment. In block 305, the multi-user application requests access to a resource of the selected user and provides the access token to the service that controls access to that resource. In block 306, the multi-user application receives from the service a handle to the resource. In block 307, the multi-user application accesses the resource using the handle then loops to block 302 to select the next user.

Figure 4:
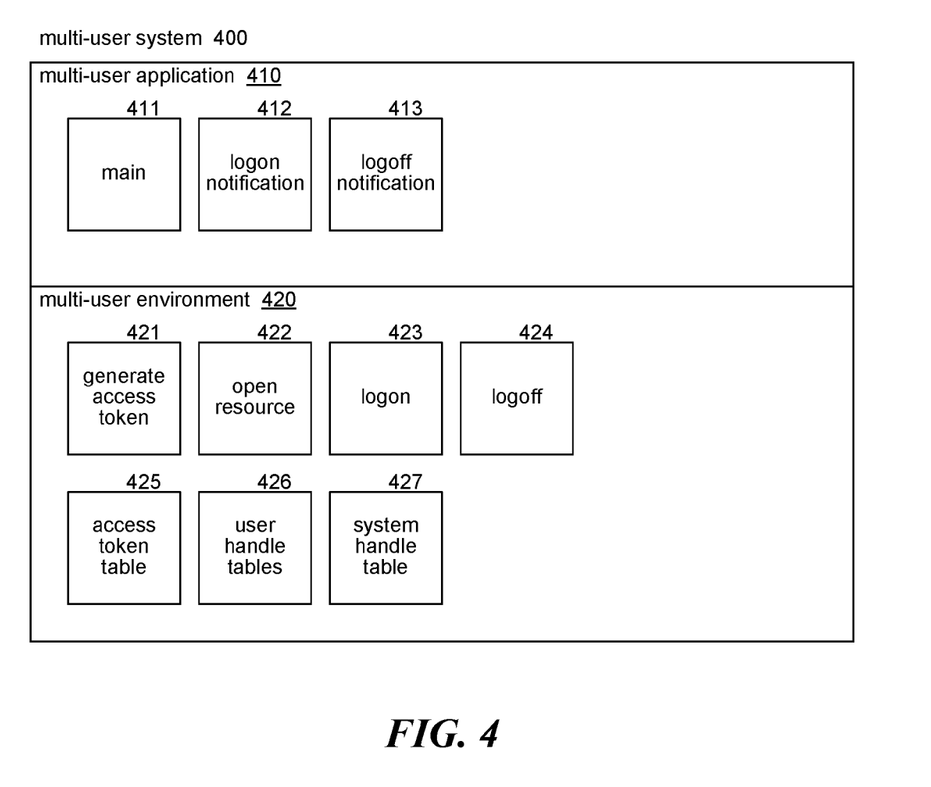
FIG. 4 is a block diagram that illustrates components of a multi-user application and a multi-user environment in some examples.

FIG. 4 is a block diagram that illustrates components of a multi-user system application and a multi-user environment in some examples. The multi-user system 400 includes one or more multi-user applications 410 and a multi-user environment 420. The multi-user application 410 includes a main component 411, a logon notification component 412, and a logoff notification component 413. The main component performs the main processing of the multi-user application, such as coordinating the playing of the game, the collaboration among users, and so on. The main component requests that the multi-user environment notify it when users log on or log off the multi-user environment. The logon notification component is invoked when a user logs on and it coordinates the retrieving of an access token for the user. The logoff notification component is invoked when a user logs off so that the multi-user application no longer uses the access token for the user or any handles for resources accessed using the access token for the user. The multi-user environment 420 includes a generate access token component 421, an open resource component 422, a logon component 423, and a logoff component 424. The multi-user environment also includes an access token table 425, user handle tables 426, and a system handle table 427. The generate access token component generates an access token for a combination of a user and a multi-user application. The open resource component is invoked to open a resource for access and return a handle to that resource. The logon component is invoked when a user logs on, and the logoff component is invoked when a user logs off. The access token table contains an entry for each access token that has been generated and indicates whether the access token has been revoked. A user handle table for a user has an entry for each handle for a resource that has been opened using the access token for that user. The system handle table contains an entry for each handle for a resource that has been opened and indicates whether the handle is valid.

The computing systems (e.g., devices) on which the multi-user system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, gaming controls, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, point-of-sale terminals, and so on. The computing systems may also include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, secondary memory (e.g., DVD), and other storage media. The computer-readable storage media may have recorded on it or may be encoded with computer-executable instructions or logic that implements the multi-user system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys, and for encrypting and decrypting data using the keys.

The multi-user system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules and components may be combined or distributed as desired in various examples. Aspects of the multi-user system may be implemented in hardware using, for example, an application-specific integrated circuit ("ASIC").

Figure 5:
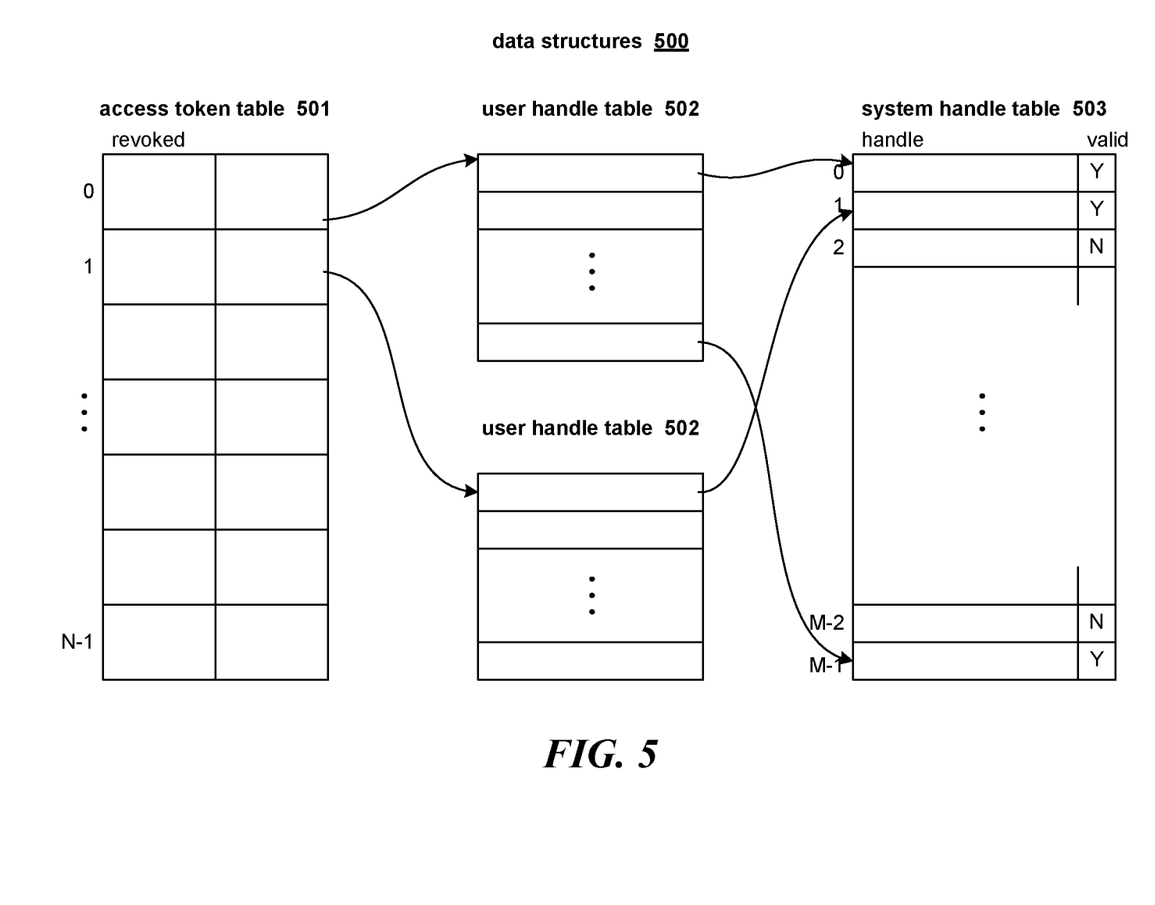
FIG. 5 is a block diagram that illustrates data structures maintained by a multi-user environment in some examples.

FIG. 5 is a block diagram that illustrates data structures maintained by a multi-user environment in some examples. The data structures 500 may include an access token table 501, user handle tables 502, and a system handle table 503. The access token table contains an entry for each access token that has been generated by the multi-user environment. Each entry contains an indication of whether the access token for the user has been revoked and a pointer to a user handle table for that user. Each access token may contain the index of the corresponding entry in the access token table. The multi-user environment can then use that index to determine whether that access token has been revoked. A user handle table for a user contains an entry for each handle that has been based on the access token for that user. Each entry of a user handle table may contain a reference to the entry for the corresponding handle in the system handle table. The system handle table contains an entry for each handle generated by the multi-user environment along with an indication of whether the handle is valid. The multi-user environment may maintain a mapping of each user to his or her corresponding entry in the access token table. Each entry can also be considered an entry for a user.

Figure 6:
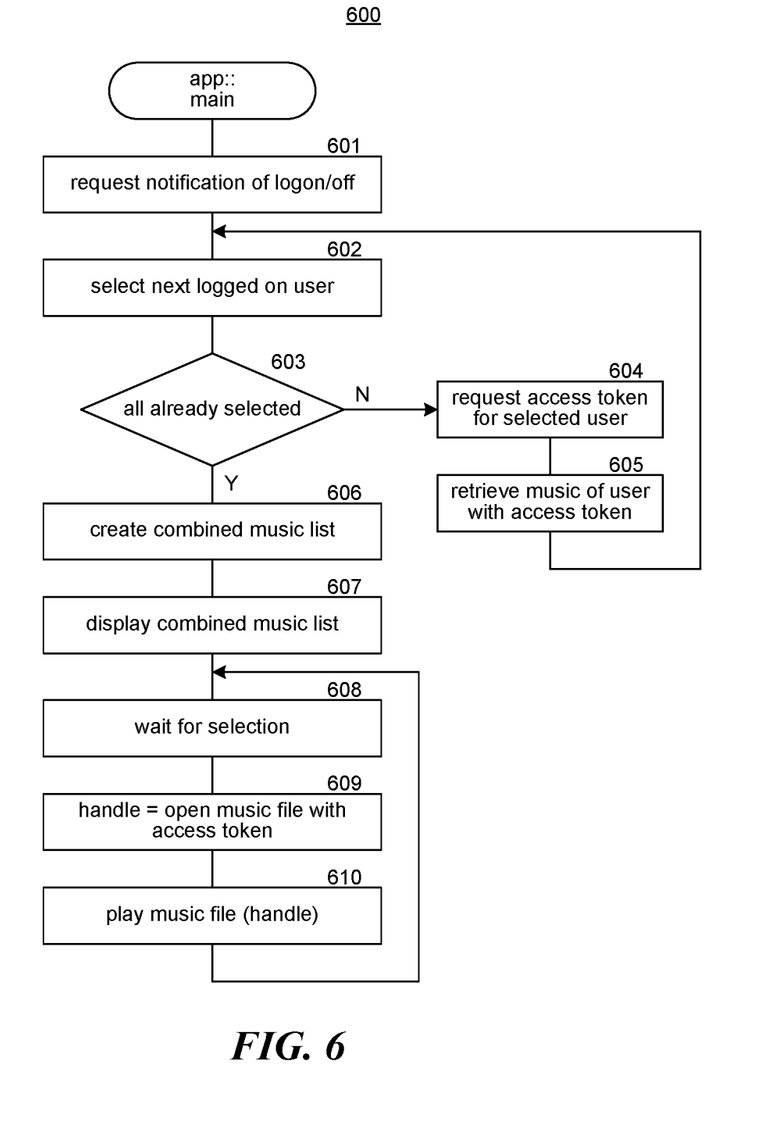
FIG. 6 is a flow diagram that illustrates the processing of a main component of a multi-user application in some examples.

FIG. 6 is a flow diagram that illustrates the processing of a main component of a multi-user application in some examples. The main component 600, in this example, is a music player that allows each user to select and play the music of any other user. In block 601, the component requests the multi-user application to provide the identity of users who are currently logged on and to provide notifications when users log on and log off. In block 602, the component selects the next logged on user. In decision block 603, if all the logged on users have already been selected, then the component continues to block 606, else the component continues to block 604. In block 604, the component requests the multi-user environment to provide an access token for the selected user. The component stores the access token for use when opening resources of that user. In block 605, the component retrieves music (e.g., names of music files) of the selected user using the access token and then loops to block 602 to select the next user. In block 606, the component creates a combined list of the music of the users. In block 607, the component displays the combined music list to each user as part of the user interface of the music player. In block 608, the component waits for a user to make a selection of music from the combined list. A user may select music of the user or the music of another user. In block 609, the component opens the music file for the selected music by passing the access token for the user who owns the music and receives a handle to the music file in return. In block 610, the component retrieves the content of the music file using the handle and plays the music of the music file. The component may play the same music to all the users or may play the music only to the user who selects the music. The component then loops to block 608 to wait for the selection of the next music.

Figure 7:
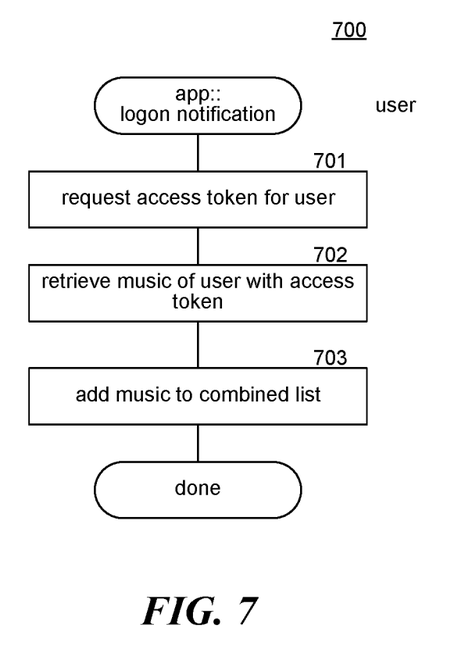
FIG. 7 is a flow diagram that illustrates the processing of a logon notification component of a multi-user application in some examples.

FIG. 7 is a flow diagram that illustrates the processing of a logon notification component of a multi-user application in some examples. The logon notification component 700 is passed an indication of a user and adds that user's music to the combined music list. In block 701, the component requests the multi-user environment to provide an access token for the user that is generated in accordance with access rights of the user and the multi-user application. In block 702, the component retrieves a list of the music of that user using the access token. In block 703, the component adds the music to the combined list of music and then completes. Each currently logged on user will then be able to select music from the combined list that includes the music of newly logged on user.

Figure 8:
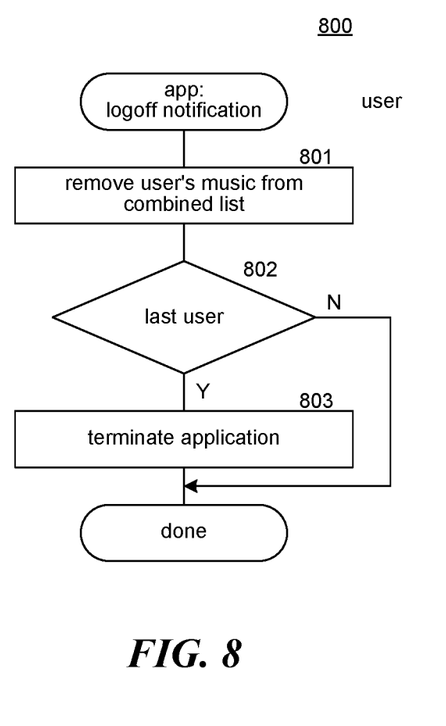
FIG. 8 is a flow diagram that illustrates the processing of a logoff notification component of a multi-user application in some examples.

FIG. 8 is a flow diagram that illustrates the processing of a logoff notification component of a multi-user application in some examples. The logoff notification component 800 is passed an indication of a user and removes the music of the user from the combined list of music. In block 801, the component suppresses the further playing of the user's music by removing the user's music from the combined list so that the music of the user can no longer be selected and played. If any music of the user is currently being played, the component may also stop playing that music. In decision block 802, if the user is the last user logged on to the multi-user application, then the component continues at block 803, else the component completes. In block 803, the component terminates the multi-user application since no users are currently logged on.

Figure 9:
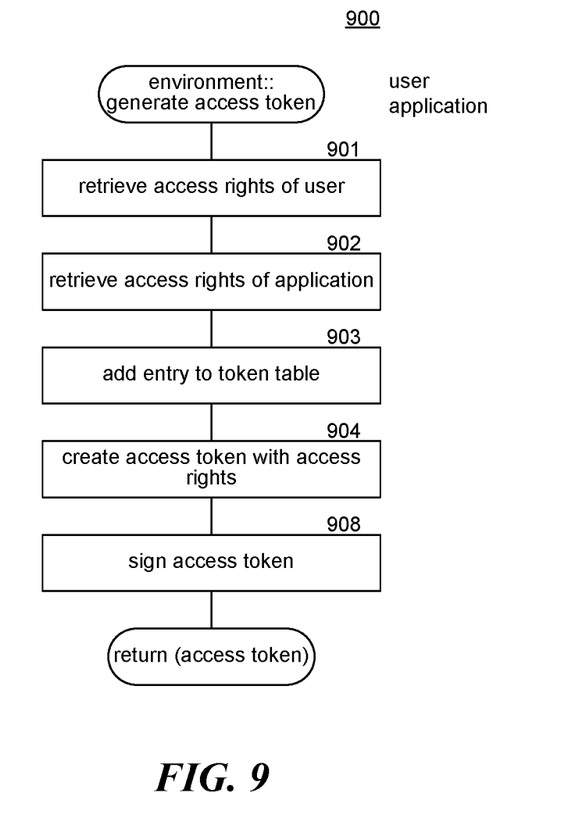
FIG. 9 is a flow diagram that illustrates the processing of a generate access token component of a multi-user environment in some examples.

FIG. 9 is a flow diagram that illustrates the processing of a generate access token component of a multi-user environment in some examples. The generate access token component 900 is passed an indication of a user and the multi-user application and generates an access token for the user. In block 901, the component retrieves the access rights of the user (assuming the access token contains a description of the access rights). In block 902, the component retrieves the access rights of the multi-user application. In block 903, the component adds an entry to the token table for the access token. In block 904, the component creates an access token that contains a description of the access rights and an identifier of the entry into the token table. An access token may contain any combination of the identifier of the user, the identifier of the multi-user application, a description of access rights (or reference to a description) of the user, and a description of access rights (or reference to a description) of the multi-user application. In block 908, the component signs or encrypts the access token using a key of the multi-user environment and provides the access token to the multi-user application.

Figure 10:
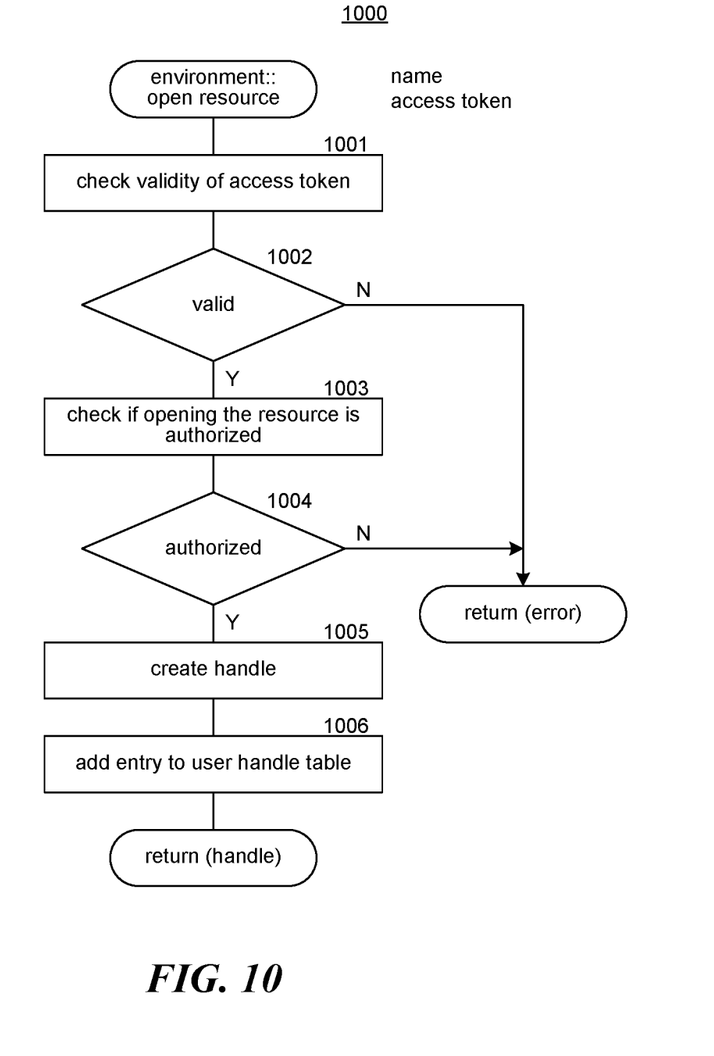
FIG. 10 is a flow diagram that illustrates the processing of an open resource component of a multi-user environment in some examples.

FIG. 10 is a flow diagram that illustrates the processing of an open resource component of a multi-user environment in some examples. The open resource component 1000 is passed an identifier of a resource that is to be opened and an access token for a user. In block 1001, the component decrypts the access token using a key of the multi-user environment. In some examples, the data of the access token may be encrypted with a private key of the multi-user environment and decrypted using the corresponding public key. The component retrieves a reference to the entry in the access token table for the access token and checks the entry to determine whether the access token is still valid. In decision block 1002, if the access token is still valid, then the component continues at block 1003, else the component prohibits access to the resource and returns an error. In block 1003, the component determines whether the opening of the resource is authorized by the access rights of the access token. In decision block 1004, if the opening is authorized, then the component continues at block 1005, else the component returns an error. In block 1005, the component creates a handle for the resource and adds an entry to the system handle table for the handle that indicates the handle is valid. In block 1006, the component adds an entry for the handle to the user handle table for the user and then returns handle.

Figure 11:
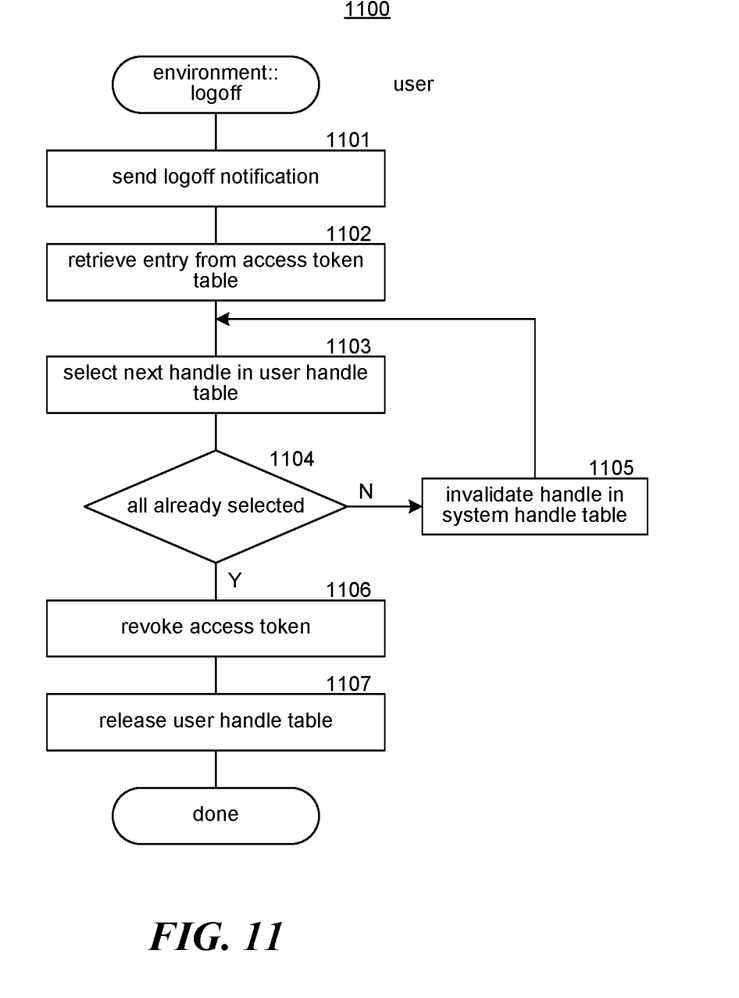
FIG. 11 is a flow diagram that illustrates the processing of a logoff component of a multi-user environment in some examples.

FIG. 11 is a flow diagram that illustrates the processing of a logoff component of a multi-user environment in some examples. The logoff component 1100 is passed an indication of a user who is logging off the multi-user environment. In block 1101, the component sends to the multi-user application a notification that the user has logged off. In block 1102, the component retrieves the entry for the user from the access token table. In blocks 1103-1105, the component loops to invalidate handles that have been opened (or otherwise had access allowed) using the access token of the user. In block 1103, the component selects the next handle in the user handle table. In decision block 1104, if all the handles have already been selected, then the component continues at block 1106, else the component continues at block 1105. In block 1105, the component invalidates the selected handle in the system handle table and then loops to block 1103 to select the next handle. In block 1106, the component revokes the access token by marking the entry into the access token table. In block 1107, the component releases the user handle table (e.g., to be reclaimed by memory management) for the user and then completes.

The following paragraphs describe various examples of aspects of the multi-user system. An implementation of a multi-user system may employ any combination of the examples. The processing described below may be performed by a computing device with a processor that executes computer-executable instructions stored on a computer-readable storage medium that implements the multi-user system.

In some examples, a method performed by a computing system for providing an application with access to resources of multiple users is provided. Under control of the application, the method identifies at least a first user and a second user. The method then retrieves a first access token for the first user. The first access token provides evidence of authorization to access a first resource in accordance with first access rights of the first user. The method retrieves a second access token for the second user. The second access token provides evidence of authorization to access a second resource in accordance with second access rights of the second user. The method accesses the first resource by providing the first access token as evidence of authorization to access the first resource in accordance with the first access rights of the first user. The method also accesses the second resource by providing the second access token as evidence of authorization to access the second resource in accordance with the second access rights of the second user. In some examples, the application executes in a low privilege mode. In some examples, the method further requests a multi-user environment to create the first access token and the second access token. In some examples, the identifying of the first user and the second user comprises during initialization of the application, requests a service to provide an indication of each user logged on to a multi-user environment. In some examples, the method requests a multi-user environment to provide notifications when a user logs on and when a user logs off. In some examples, the method, after receiving a notification that the first user has logged off, suppresses the accessing of the first resource. In some examples, the method, after receiving a notification that a third user has logged on, retrieves a third access token for the third user. The third access token provides evidence of authorization to access a third resource in accordance with third access rights of the third user. The method also accesses the third resource by providing the third access token as evidence of authorization to access the third resource in accordance with the third access rights of the third user. In some examples, the application has access rights to resources and the accessing of the first resource is further in accordance with access rights of the application. In some examples, the first access token further provides evidence of authorization to access the first resource in accordance with the access rights of the application.

In some examples, a computing system that provides access by a multi-user application to resources of multiple users is provided. The computing system comprises at least one processor and a computer-readable storage medium storing computer-executable instructions that, based on execution by the at least one processor, provide to the multi-user application an access token for a user who is logged onto the computing system. The access token provides evidence of authorization to access at least one of the resources in accordance with access rights of the user. When the multi-user application provides the access token when requesting access to the at least one of the resources, the instructions determine whether the requested access is authorized based on the evidence of authorization provided by the access token. After determining that the requested access is authorized, the instructions provide to the multi-user application a handle for the at least one of the resources. When the user logs off the computing system, the instructions designate the handle as invalid. In some examples, when the user logs off the computing system, the instructions designate the access token as revoked. In some examples, when the multi-user application provides an access token requesting access to the resource after the user has logged off, the instructions prohibit the requested access to the resource. In some examples, the instructions combine an indication of access rights of the user and an indication of access rights of the multi-user application to generate the access token. In some examples, the instructions that combine include instructions that sign the combination of the access rights. In some examples, the instructions add the access token to an access token table and add the handle to a handle table.

In some examples, a computer-readable storage medium stores computer-executable instructions of a multi-user application that executes in user privilege mode. The instructions identify at least a first user and a second user who are logged on to the computing device; retrieve a first access token for the first user. The first access token provides evidence of authorization to access resources in accordance with first access rights of the first user and access rights of the multi-user application. The instructions retrieve a second access token for the second user. The second access token provides evidence of authorization to access resources in accordance with second access rights of the second user and access rights of the multi-user application. The instructions request access to a first resource by providing the first access token as evidence of authorization to access the first resource. The instructions request access to a second resource by providing the second access token as evidence of authorization to access the second resource. The instructions receive a first handle for use in accessing the first resource; receive a second handle for use in accessing the second resource. The instructions access the first resource by providing the first handle. The instructions access the second resource by providing the second handle wherein the multi-user application access resources in accordance with access rights of multiple users without having to execute in a high privilege mode. In some examples, the instructions request to receive notifications of users who log on and log off a multi-user environment. In some examples, when a notification that the first user has logged off the computing device is received, the instructions suppress access to the first resource. In some examples, the instruction request a multi-user environment service to create the first access token for the first user. In some examples, the instructions generate a user interface based on the first resource and the second resource.

Although the subject matter has been described in language specific to structural features and/or acts, it is to be understood that the subject matter defined in the appended claims is not necessarily limited to the specific features or acts described above. For example, the multi-user system may even be employed by applications that might not be considered "multi-user" in the sense that they are used by multiple users. As an example, an educational application executing in a low privilege mode may have a teacher as the only logged on user, but allow the teacher to access resources of pupils. In such a case, the teacher may have access rights to use access tokens of the pupils. The access tokens would allow the educational application to access resources of the pupils in accordance with the access rights of each pupil and the access rights of the educational application. Such an educational application may be considered "multi-user" in the sense that the educational application can access resources of the multiple users who are not currently using the educational application. In addition, a resource can be any resource accessible to a user of a multi-user application. For example, a multi-user fitness program may have access to fitness trackers worn by each user. The fitness tracker may collect various data about a user, such as pulse rate, stride count, and so on. The multi-user fitness program may use an access token to collect the data from each user and display the data to the other users. Rather, the specific features and acts described above are disclosed as example forms of implementing the claims. Accordingly, the invention is not limited except as by the appended claims.

The invention claimed is:

1. A method performed by a computing system, the method comprising, under control of the application:
   identifying at least a first user and a second user that are logged onto an application, wherein the application executes on an operating system in a mode that allows the application access rights to a first resource of the first user and a second resource of the second user;
   retrieving a first access token for the first user, the first access token providing evidence of authorization to access the first resource in accordance with first access rights of the first user;
   retrieving a second access token for the second user, the second access token providing evidence of authorization to access the second resource in accordance with second access rights of the second user;
   accessing the first resource by providing the first access token as evidence of authorization to access the first resource in accordance with the first access rights of the first user;
   accessing the second resource by providing the second access token as evidence of authorization to access the second resource in accordance with the second access rights of the second user, wherein the access rights of the application for the first user are restricted to the first resource when using the first access token and the access rights of the application for the second user are restricted to the second resource when using the second access token; and
   providing, via a user interface, access to the first resource to the first user and access to the second resource to the second user, wherein upon a logoff of the first user, suppressing access to the first resource, and upon a logoff of the second user, suppressing access to the second resource.

2. The method of claim 1 wherein the mode comprises a low privilege mode.

3. The method of claim 1 further comprising requesting a multi-user environment to create the first access token and the second access token.

4. The method of claim 1 wherein the identifying of the first user and the second user comprises during initialization of the application, requesting a service to provide an indication of each user logged on to a multi-user environment.

5. The method of claim 1 further comprising requesting a multi-user environment to provide notifications when the first user and the second user log on and when the first user and the second user log off.

6. The method of claim 5 further comprising, after receiving a notification that a third user has logged on:
   retrieving a third access token for the third user, the third access token providing evidence of authorization to access a third resource in accordance with third access rights of the third user; and
   accessing the third resource by providing the third access token as evidence of authorization to access the third resource in accordance with the third access rights of the third user.

7. The method of claim 1 wherein the accessing of the first resource is further in accordance with the access rights of the application.

8. The method of claim 7 wherein the first access token further provides evidence of authorization to access the first resource in accordance with the access rights of the application.

9. The method of claim 1 wherein the mode does not allow the application access rights to operating system resources directly.

10. The method of claim 1 wherein the mode does not allow the application to access of a third user with the first access token and the second access token.

11. The method of claim 1, further comprising:
    generating the user interface based on the first resource and the second resource.

12. The method of claim 1, wherein the application accesses resources in accordance with access rights of multiple users without having to execute in a high privilege mode on the operating system.

13. A computer-readable storage medium storing computer-executable instructions of a multi-user application that, based on execution by a computing device, cause the computing device to:
    identify at least a first user and a second user who are logged on to the computing device;
    retrieve a first access token for the first user, the first access token providing evidence of authorization to access a first resource in accordance with first access rights of the first user and access rights of the multi-user application;
    retrieve a second access token for the second user, the second access token providing evidence of authorization to access a second resource in accordance with second access rights of the second user and the access rights of the multi-user application;
    request access to the first resource by providing the first access token as evidence of authorization to access the first resource;

request access to the second resource by providing the second access token as evidence of authorization to access the second resource;
receive a first handle for use in accessing the first resource;
receive a second handle for use in accessing the second resource;
access the first resource by providing the first handle;
access the second resource by providing the second handle; and
provide, via a user interface, access to the first resource to the first user and access to the second resource to the second user, wherein upon a logoff of the first user, suppress access to the first resource, and upon a logoff of the second user, suppress access to the second resource, wherein:
the multi-user application executes on an operating system in a mode that allows the application the access rights to the first resource of the first user and the second resource of the second user, and
the access rights of the application for the first user are restricted to the first resource when using the first access token and the access rights of the application for the second user are restricted to the second resource when using the second access token.

14. The computer-readable storage medium of claim 13 wherein the computer-executable instructions further include instructions that, based on execution by the computing device, cause the computing device to request to receive notifications of users who log on and log off a multi-user environment.

15. The computer-readable storage medium of claim 13 wherein the computer-executable instructions include instructions that, based on execution by the computing device, cause the computing device to request a multi-user environment service to create the first access token for the first user.

16. The computer-readable storage medium of claim 13 wherein the computer-executable instructions include instructions that, based on execution by the computing device, cause the computing device to generate the user interface based on the first resource and the second resource.

17. The computer-readable storage medium of claim 13 wherein the mode comprises a low privilege mode.

18. The computer-readable storage medium of claim 13 wherein the multi-user application accesses resources in accordance with access rights of multiple users without having to execute in a high privilege mode on the operating system.

19. The computer-readable storage medium of claim 13 wherein the mode does not allow the application to access of a third user with the first access token and the second access token.

20. A computing system comprising:
at least one processor; and
a computer-readable storage medium storing computer-executable instructions that, based on execution by the at least one processor, configure the processor to:
identify at least a first user and a second user that are logged onto an application, wherein the application executes on an operating system in a mode that allows the application access rights to a first resource of the first user and a second resource of the second user;
retrieve a first access token for the first user, the first access token providing evidence of authorization to access the first resource in accordance with first access rights of the first user;
retrieve a second access token for the second user, the second access token providing evidence of authorization to access the second resource in accordance with second access rights of the second user;
access the first resource by providing the first access token as evidence of authorization to access the first resource in accordance with the first access rights of the first user;
access the second resource by providing the second access token as evidence of authorization to access the second resource in accordance with the second access rights of the second user, wherein the access rights of the application for the first user are restricted to the first resource when using the first access token and the access rights of the application for the second user are restricted to the second resource when using the second access token; and
provide, via a user interface, access to the first resource to the first user and access to the second resource to the second user, wherein upon a logoff of the first user, suppress access to the first resource, and upon a logoff of the second user, suppress access to the second resource.

* * * * *